United States Patent Office 3,174,957
Patented Mar. 23, 1965

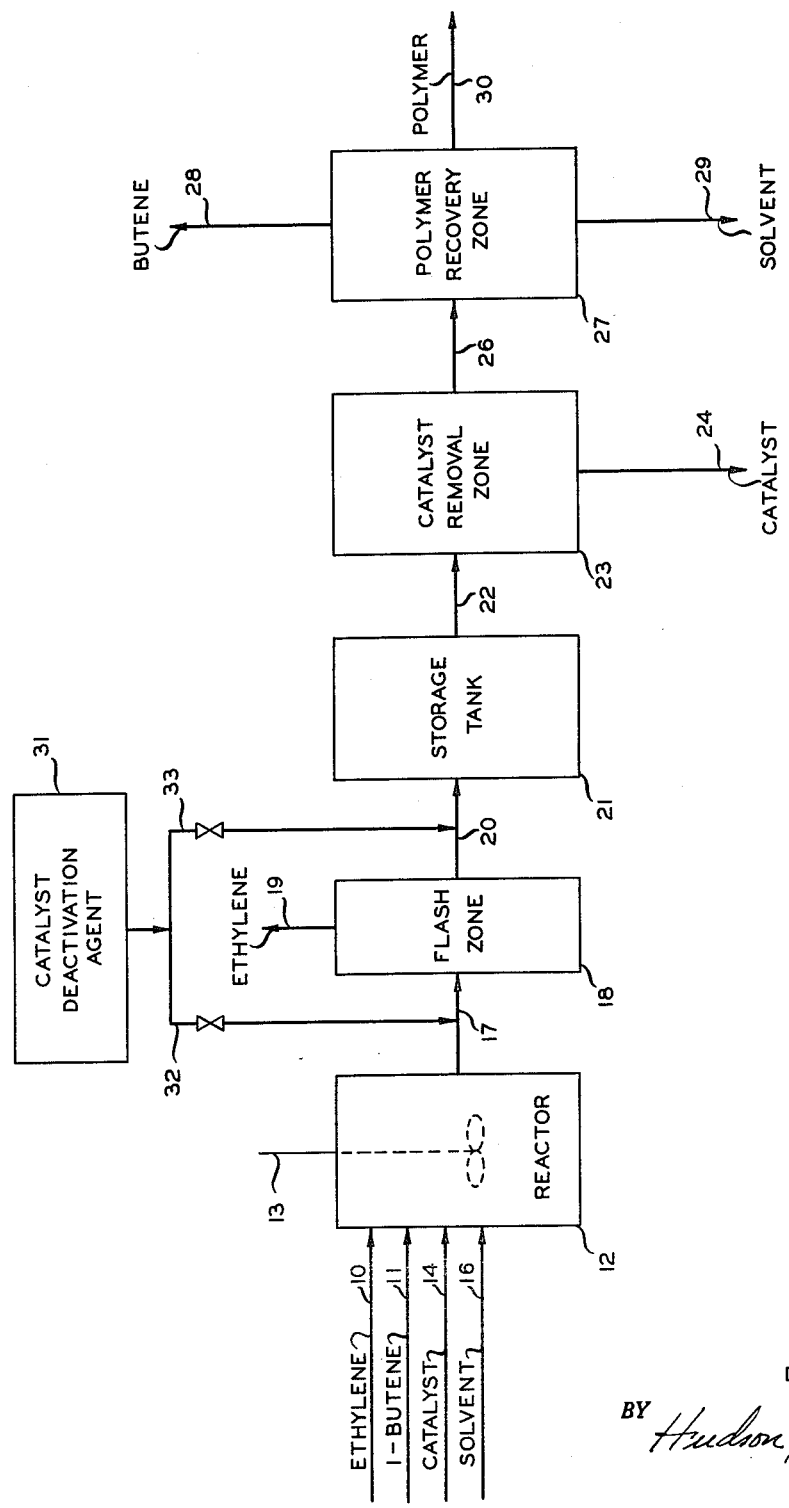

3,174,957
COPOLYMERIZATION OF ETHYLENE WITH
HIGHER OLEFINS
Dick S. Hall, Bartlesville, Okla., assignor to Phillips
Petroleum Company, a corporation of Delaware
Filed Mar. 25, 1959, Ser. No. 801,820
6 Claims. (Cl. 260—88.2)

This invention relates to the copolymerization of ethylene with at least one other olefin having from 3 to 8 carbon atoms per molecule. In another aspect it relates to a method of controlling the melt index of a normally solid copolymer of ethylene and a higher olefin such as propylene or 1-butene.

Monoolefins having from 2 to 8 carbon atoms per molecule and no chain branching nearer the double bond than the 4-position can be polymerized in the presence of a metallic oxide catalyst containing chromium oxide, at least a portion of the chromium being in the hexavalent state, to high molecular weight polymers. Such a process is described in detail in the patent to J. P. Hogan et al., U.S. 2,825,721, issued March 4, 1958. In the continuous process the reaction can be carried out in solution employing a hydrocarbon diluent and introducing the catalyst to the reactor in the form of a slurry. Ethylene is flashed from the reactor effluent and the solution is filtered to remove solid catalyst. Polymer is then recovered from the solution.

In the past when copolymerizing ethylene with higher olefins, the control of melt index in the final product has been difficult. The reactor conditions were regulated to produce a given melt index for the polymer sampled from the reactor but invariably a higher melt index was obtained in the ultimate polymer product. Lowering the temperature in the reactor to produce a lower melt index originally so that the final product would meet specification reduced the temperature differential in the reactor which in turn impaired the cooling efficiency and curtailed production rate. Furthermore, the extent of the melt index rise varies considerably and does not appear to be predictable. The above-described melt index increase is not apparent in the formation of the ethylene homopolymer but appears to be peculiar to the copolymerization of ethylene with higher olefins.

I have discovered that the above-described problem of melt index control can be solved by injecting a catalyst poison into the reactor effluent so that the catalyst therein is inactivated. I have concluded as a result of this discovery that in the continuous copolymerization of ethylene with higher olefins, reactions take place in the effluent stream after the ethylene has been flashed therefrom which considerably affect the melt index of the final product. Based upon this discovery, my invention involves inactivating the catalyst in the reactor effluent either before, during, or immediately after removal of the ethylene from this stream. I further have found it advantageous to use a poison for the chromium oxide catalyst which is relatively non-volatile in comparison to the monomers, especially the ethylene. To enable recovery of an ethylene stream of highest purity, injection of the poison immediately after the initial flashing step is preferred. This procedure enables the melt index of the product to be stabilized yet eliminates the possibility of catalyst poison in the recovered ethylene stream which is to be recycled to the reactor.

It is an object of my invention to provide an improved method for continuously copolymerizing ethylene with higher olefins. Another object of my invention is to provide a method of stabilizing the melt index of the reaction product in an ethylene copolymerization process. Another object is to enable higher reaction rates by the use of a higher reactor temperature and still meet a low melt index specification in the finished product. Still another object is to provide a method for stabilizing melt index of the copolymer without damaging the purity of the ethylene stream recovered from the reactor effluent. Other objects, advantages and features of my invention will be apparent to those skilled in the art from the following discussion and drawing which is a simplified flow diagram showing the overall polymerization process including recovery steps with the addition of catalyst deactivation agent according to my invention.

In its broad aspect my invention is concerned with the copolymerization of ethylene and at least one other olefin, most frequently a 1-olefin having from 3 to 8 carbon atoms per molecule and no chain branching nearer the double bond than the 4-position in the presence of a chromium oxide catalyst. My invention is especially advantageous in regard to the copolymerization of ethylene and 1-butene. It also applies to the copolymerization of ethylene and 2-butene. The catalysts to which my invention applies are those described in the above-mentioned patent to J. P. Hogan et al. These catalysts comprise, as the sole essential effective catalytic ingredients thereof, chromium oxide containing hexavalent chromium at the initial contacting of hydrocarbon with said catalyst and silica, alumina, thoria, zirconia or composites thereof and can be prepared by impregnating the carrier material with aqueous solutions of salts of chromium. The catalyst is then dried and activated at a temperature in the range of 450 to 1500° F. preferably under non-reducing conditions for several hours. The hexavalent chromium content of the activated catalyst should be at least 0.1 percent by weight. My invention also applies to polymerizations employing an ethylene feed and mixed catalysts of chromium oxide and nickel oxide or cobalt oxide supported on a suitable carrier such as silica, alumina, thoria, zirconia or composites thereof. Although both cobalt and nickel oxides can be used in such catalysts the nickel oxide is preferred. For example, a suitable catalyst is one prepared by co-impregnating silica-alumina, for example, 90 percent silica and 10 percent alumina, with salts of chromium and nickel followed by drying and activating as above-described in regard to the chromium oxide catalyst. The amount of metal oxides in the catalyst composite are between about 0.5 and 10 percent by weight expressed as the metal, preferably about 1 to 4 percent by weight of the total catalyst. The ratio of nickel to chromium can vary over a wide range but is preferably between about 2:1 and about 4:1 expressed as a mole ratio. Suitable catalysts can also be prepared by impregnating the support with chromium and nickel salts separately and then mixing the catalysts physically, in which case a preferred ratio of nickel to chromium is between about 0.2:1 and 2:1. It is intended that the use of such catalysts with ethylene feed be included within the scope of my invention and such use is included in my discussion and claims by the term "copolymerization" since it has been found that when using such catalysts a polymer having the same characteristics as the copolymer of ethylene and 1-butene is formed. Furthermore, the above-described phenomenon of melt index increase is observed when using such catalysts and the practice of my invention successfully overcomes this difficulty.

Referring now to the drawing, the continuous process of copolymerization as practiced with chromium oxide catalysts supported on silica-alumina is shown. Ethylene and 1-butene are fed in stream 10 and 11, respectively, to a reactor 12 which is equipped with agitation means 13 and suitable heat exchange means such as a jack and internal cooling coils not shown. Catalyst is generally fed to the reactor in the form of a slurry of solid catalyst in reaction diluent entering the reactor through line 14. Solvent which is a hydrocarbon, preferably a paraffin, is fed to the reactor through line 16.

Suitable diluents are paraffins having about 3 to 12 carbon atoms per molecule such as propane, isobutane, n-pentane, isopentane, isooctane, decane, dodecane, and the like. Preferably those paraffins having at least 5 carbon atoms per molecule are used. The cycloparaffins, such as cyclohexane and methyl cyclohexane, are also suitable. In addition to the foregoing, other hydrocarbon diluents which are relatively inert and in the liquid state under the reaction conditions can be employed. In general, the quantity of the diluent is relatively large in relation to the olefin feed. For example, the olefin feed usually constitutes about 0.1 to about 25 percent by weight of the mixture.

In the formation of copolymer having highly desirable properties, the amount of comonomer in the reaction mixture can range from 1 to 30 weight percent of the total monomer and is preferably between about 3 to 15 weight percent. Although higher olefins can be used, it is preferred to copolymerize ethylene with either propylene or 1-butene. The amount of comonomer incorporated into the polymer is generally less, approximately one-third, of that employed in the monomer mixture in the reactor. The preferred copolymers usually contain about 1 mol percent to about 5 mol percent of the higher comonomer based on the total olefin content of the polymer.

The polymerization conditions are generally in the range of about 170 to 300° F. and the reaction pressure is that sufficient to maintain a liquid phase, normally at least about 100 to 300 p.s.i.g. Higher pressures can be used if desired.

The reaction effluent leaves reactor 12 through line 17 and passes to a flash zone 18 which normally comprises a series of flash stages in which the pressure on the effluent is reduced step-wise and ethylene is flashed therefrom in overhead gas stream 19. Ethylene is recovered and following any necessary purification steps is recycled to reactor 12. The effluent then passes through line 20 to a storage tank 21 in which it may be held for a period of about 1 to 4 hours or more depending upon the size of the operation. More diluent is added if desired to adjust the polymer concentration so that the catalyst can be removed by filtration or centrifugation. The effluent stream then passes through line 22 to catalyst removal zone 23.

Catalyst removed is ordinarily discarded through line 24 and although the catalyst can be reactivated it is frequently more economical to prepare fresh catalyst. The introduction of a catalyst poison, therefore, downstream from the reactor according to my invention will normally pose no problem in regard to the reuse of catalyst. The effluent having had the catalyst removed then passes through line 26 to polymer recovery zone 27 which can comprise fractionation and precipitation steps to recover other unreacted monomer such as butene through line 28, solvent through line 29, and polymer product through conduit 30. Any of a number of recovery schemes which have been developed for this continuous process can be used and do not affect the application of my invention.

The catalyst deactivation agent 31 can be added continuously through line 32 to the effluent stream in line 17 entering the flash zone. Preferably, however, the deactivation agent is added through line 33 to the stream in line 20 leaving the ethylene flash zone. The poison can also be injected into the flash vessels or, where multiple flashing steps are used, it is desirable to inject the catalyst poison immediately after the first flashing step so that the catalyst is deactivated as soon as the major portion of the unreacted ethylene is removed from the effluent stream. The poison can be added to the storage tank 21 but in any event the catalyst should be deactivated before the effluent solution and catalyst slurry is permitted to stand for any period of time, for example, 30 minutes or more.

A number of catalyst poisons or deactivation agents can be employed but I prefer to use relatively non-volatile oxygen-containing compounds. Such compounds have been found to be effective, for instance, for the catalyst described when used in relatively small concentrations and being non-volatile do not tend to carry over in the recovered monomer streams. Water has been found to be an excellent poison for use in my invention and is effective in amounts as low as 0.4 percent, based on the weight of the catalyst. Another poison which I have found highly suitable is an antioxidant, 4,4'-thio-bis (6-tertbutyl-metacresol). This antioxidant is equally as effective as water and serves a useful purpose since it remains in the polymer. Another poison which is preferred is methyl carbitol. This compound is effective in concentrations as low as 2 weight percent based on the catalyst and, furthermore, it has a low vapor pressure so that it does not carry overhead with the recycled olefins. Methyl carbitol is soluble in cold cyclohexane which can be used as the addition vehicle and it does not affect the color or the properties of the polymer. Many other catalyst poisons can be employed and examples of several are given below in the following table:

TABLE I

| Catalyst poison: | Percent [a] poison required to deactivate catalyst |
|---|---|
| Oxygen | 0.4 |
| Carbon monoxide | 0.4 |
| Dimethyl formamide | 0.4 |
| Ethyl ether | [b] 0.5 |
| Acetone | [b] 0.5 |
| Ethyl alcohol | [b] 1.25 |
| Diethyl sulfide | [c] 2.0 |
| Isobutyl mercaptan | [c] 2.5 |
| Acetylene | 2.0 |
| Ammonia | 0.4 |
| Carbon tetrachloride | [d] 0.6 |
| n-Butyl chloride | [d] 0.8 |
| Sec-butyl chloride | [d] 0.6 |

[a] Percentage based on weight of catalyst.
[b] Percentage based on combined oxygen content of poison.
[c] Percentage based on combined sulfur content of poison.
[d] Percentage based on combined chlorine content of poison.

Melt index is defined as the grams of polymer extruded in 10 minutes through a 0.0825 inch orifice at 190° C. when subjected to a load of 2160 grams. A dead weight piston plastometer manufactured by the F. F. Slocomb Corporation is used for this test.

The ASTM D-1238 procedure is used except that for a melt index range of 0–0.7, three 2-minute extruded samples are taken, the third sample is cooled and weighed and the weight is multiplied by 5. For a melt index range of 0.7–10, one 3-minute extrudate sample is weighed and the weight is multiplied by 3.33 to arrive at a flow rate (F) which is converted to melt index (MI) by the formula:

$$\log MI = 0.92 \log F + 1.039$$

As an example of the manner in which my invention serves to provide more uniform polymer quality, the following specific conditions are presented.

*Example I*

Ethylene and 1-butene were copolymerized in a cyclohexane diluent in the presence of a chromium oxide catalyst (2.5 weight percent chromium on a 90/10 silica/alumina support) activated as described above in the specification. Melt index was determined on samples taken periodically from both the flash chamber for ethylene removal and the polymer dryer in the polymer recovery zone. Over a 5 day run average daily reactor conditions and polymer properties were as shown in Table II.

TABLE II

| Day | Reactor Conditions | | | | | Polymer Melt Index | | Polymer Density, Flash Chamber |
|---|---|---|---|---|---|---|---|---|
| | Pressure (p.s.i.g.) | Temperature, °F. | Polymer Concentration (Wt. percent) | Residence Time (Hours) | Ethylene/ 1-Butene Weight Ratio | Flash Chamber | Dryer | |
| 1 | 200 | 237 | 6.5 | 1.9 | 76/24 | 0.57 | 0.91 | 0.938 |
| 2 | 200 | 237 | 5.9 | 1.9 | 76/24 | 0.68 | 1.09 | 0.940 |
| 3 | 200 | 236 | 6.8 | 1.9 | 70/30 | 0.68 | 0.77 | 0.937 |
| 4 | υ0 | 233 | 7.2 | 1.9 | 70/30 | 0.84 | 0.71 | 0.935 |
| 5 | 250 | 232 | 6.9 | 1.9 | 71/29 | 0.51 | 0.55 | 0.936 |

As can be seen above on the first and second days a considerable rise in melt index was evident between the flash chamber and the dryer. On the evening of the second day water injection into the flash chamber was started. Improved results were immediately obtained.

During this period the catalyst consumption averaged 9.1 pounds per day. Water was added at a rate of 12.7 pounds per day. This is considerably in excess of that required to kill the catalyst in the effluent stream.

*Example II*

A two-day run was made in which ethylene and 1-butene were copolymerized in the presence of the same type of catalyst used in Example I. The diluent was a 75/25 mixture of n-hexane and cyclohexane. Reactor conditions were as follows:

Temperature _____ °F__ 241
Pressure _____ p.s.i.g__ 420
Residence time _____ hours__ 1.5
Ethylene/1-butene ratio _____ 72/28
Polymer density at flash chamber _____ 0.936

Residence time in the flash chamber was increased from 15 minutes (Example I) to 40 minutes which made flash chamber residence time significant in melt index control. Samples were taken every two hours from the reactor and the flash chamber and the melt index of the polymer determined. The results of these determinations are shown in Table III.

TABLE III

| Time | Melt Index | |
|---|---|---|
| | Reactor | Flash Chamber |
| 0100 | .44 | .56 |
| 0300 | .42 | .56 |
| 0500 | .44 | .48 |
| 0700 | .48 | .56 |
| 0900 | .49 | .55 |
| 1100 | .55 | .68 |
| 1300 | .54 | |
| 1500 | .59 | .92 |
| 1700 | .54 | .71 |
| 1900 | .44 | .49 |
| 2100 | .30 | .42 |

The average melt index of polymer in the reactor for this period was 0.48 while that for the polymer from the flash chamber was 0.59. This rise is less than that which occurs between the flash chamber and dryer as shown in Example I because of lower residence time after ethylene removal. The melt index rise was more than could be tolerated, however, and methyl Carbitol addition to the flash chamber was begun at a rate of 1 pound per 50 pounds of catalyst in the effluent. Methyl Carbitol was added as a 0.1 percent solution in the reaction diluent. Melt index determinations were continued and the results are shown in Table IV.

TABLE IV

| Time | Melt Index | |
|---|---|---|
| | Reactor | Flash Chamber |
| 2300 | .43 | .38 |
| 0100 | .34 | .38 |
| 0300 | .33 | .31 |
| 0500 | .33 | .36 |
| 0700 | .39 | .37 |

The average melt index of polymer from the reactor and from the flash chamber was 0.36. Addition of methyl Carbitol definitely brought the melt index under control. Sampling for melt index was discontinued for 10 hours and then resumed again for a 6-hour period. The average melt index of polymer in the reactor was 0.52 and that of polymer in the flash chamber was 0.57 indicating a small but permissible rise.

In density determinations the specimens should be prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

Density is determined by placing a pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity which is numerically equal to density in grams per cc. when the balance is standardized to read 1.000 with water at 4° C.

As will be evident to those skilled in the art, various modifications of this invention can be made, or followed, in the light of the foregoing disclosure and discussion, without departing from the spirit or scope thereof.

I claim:

1. In a polymerization process wherein ethylene is copolymerized in a reaction zone with 1-olefin having 3 to 8 carbon atoms per molecule and no chain branching nearer the double bond than the 4-position in a liquid diluent and in the presence of a solid catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst, and the polymerization effluent containing said diluent, copolymer, catalyst and unreacted monomer is passed to a flash zone wherein unreacted ethylene is vaporized and separated from the unvaporized effluent, the method of preventing an increase in melt index of said copolymer after it leaves said reaction zone which comprises adding the monomethyl ether of diethylene glycol to said flash zone in sufficient amount to kill the activity of said catalyst, and passing said unvaporized effluent containing diluent, copolymer, unvaporized monomer and inactivated catalyst to subsequent recovery operation.

2. In a polymerization process wherein ethylene is copolymerized in a reaction zone with 1-olefin having 3 to 8 carbon atoms per molecule and no chain branching nearer the double bond than the 4-position in a liquid diluent and in the presence of a solid catalyst active for such polymerization and comprising, as the sole essential effective catalytic ingredients thereof, chromium oxide and at least one material selected from the group consisting of silica, alumina, zirconia and thoria, at least part of the chromium being in the hexavalent state at the initial contacting of hydrocarbon with said catalyst, and the polymerization effluent containing said diluent, copolymer, catalyst and unreacted monomer is passed to a flash zone wherein unreacted ethylene is vaporized and separated from the unvaporized effluent, the method of preventing an increase in melt index of said copolymer after it leaves said reaction zone which comprises adding 4,4'-thio-bis (6 tert-butyl meta cresol) to said flash zone in sufficient amount to kill the activity of said catalyst, and passing said unvaporized effluent containing diluent, copolymer, unvaporized monomer and inactivated catalyst to subsequent recovery operation.

3. In a polymerization process wherein ethylene is copolymerized in a reaction zone with 1-olefin having 3 to 8 carbon atoms per molecule and no chain branching nearer the double bond than the 4-position in a liquid diluent in the presence of a solid catalyst active for such polymerization and comprising, as the sole effective catalytic ingredients thereof, chromium oxide and at least one material selected from the group consisting of silica, alumina, zirconia, and thoria, at least part of the chromium being in the hexavalent state at the initial contacting of hydrocarbon with said catalyst, the reaction zone effluent is flashed to recover therefrom unreacted ethylene, catalyst is separated from said effluent and polymer is thereafter recovered from solution, a method of preventing an increase in melt index of the polymer after it leaves said reaction zone which comprises injecting 4,4'-thio-bis (6-tert-butyl meta cresol) within 30 minutes after said effluent leaves said reaction zone and before separating catalyst from said effluent into said effluent in sufficient amount to kill the activity of said catalyst.

4. In a polymerization process wherein ethylene is copolymerized in a reaction zone with 1-olefin having 3 to 8 carbon atoms per molecule and no chain branching nearer the double bond than the 4-position in a liquid diluent in the presence of a solid catalyst active for such polymerization and comprising, as the sole effective catalytic ingredients thereof, chromium oxide and at least one material selected from the group consisting of silica, alumina, zirconia, and thoria, at least part of the chromium being in the hexavalent state at the initial contacting of hydrocarbon with said catalyst, the reaction zone effluent is flashed to recover therefrom unreacted ethylene, catalyst is separated from said effluent and polymer is thereafter recovered from solution, a method of preventing an increase in melt index of the polymer after it leaves said reaction zone which comprises injecting the monomethyl ether of diethylene glycol within 30 minutes after said effluent leaves said reaction zone and before separating catalyst from said effluent into said effluent in sufficient amount to kill the activity of said catalyst.

5. In a polymerization process wherein a monomer system containing at least 70 weight percent ethylene and at least 1 weight percent comonomer selected from the group consisting of propylene and 1-butene is contacted in a reaction zone in a hydrocarbon diluent with a solid catalyst active for such polymerization and containing, as the sole effective catalytic ingredients thereof, chromium oxide and at least one material selected from the group consisting of silica, alumina, zirconia, and thoria, at least part of the chromium being in the hexavalent state at the initial contacting of hydrocarbon with said catalyst so that normally solid copolymer is formed in solution in said diluent, a reaction zone effluent is flashed to separate unreacted ethylene, the effluent is then accumulated in a storage zone and passed through a catalyst removal zone, and the unreacted comonomer is then separated by volatilization and the copolymer recovered from solution, a method of preventing an increase in melt index of the copolymer after it leaves said reaction zone which comprises injecting the monomethyl ether of diethylene glycol within 30 minutes after said effluent leaves said reaction zone and before passing said effluent to said catalyst removal zone into said effluent in sufficient amount to kill the activity of said catalyst.

6. In a polymerization process wherein a monomer system containing at least 70 weight percent ethylene and at least 1 weight percent comonomer selected from the group consisting of propylene and 1-butene is contacted in a reaction zone in a hydrocarbon diluent with a solid catalyst active for such polymerization and containing, as the sole effective catalytic ingredients thereof, chromium oxide and at least one material selected from the group consisting of silica, alumina, zirconia, and thoria, at least part of the chromium being in the hexavalent state at the initial contacting of hydrocarbon with said catalyst so that normally solid copolymer is formed in solution in said diluent, a reaction zone effluent is flashed to separate unreacted ethylene, the effluent is then accumulated in a storage zone and passed through a catalyst removal zone, and the unreacted comonomer is then separated by volatilization and the copolymer recovered from solution, a method of preventing an increase in melt index of the copolymer after it leaves said reaction zone which comprises injecting 4,4'-thio-bis (6-tert-butyl meta cresol) within 30 minutes after said effluent leaves said reaction zone and before passing said effluent to said catalyst removal zone into said effluent in sufficient amount to kill the activity of said catalyst.

References Cited in the file of this patent

UNITED STATES PATENTS

| | | |
|---|---|---|
| 2,791,576 | Field et al. | May 7, 1957 |
| 2,799,668 | Anderson et al. | July 16, 1957 |
| 2,825,721 | Hogan et al. | Mar. 4, 1958 |
| 2,845,412 | Heyson | July 29, 1959 |
| 2,886,561 | Reynolds et al. | May 12, 1959 |
| 2,890,214 | Brightbill et al. | June 9, 1959 |
| 2,930,789 | Kerber et al. | Mar. 29, 1960 |
| 2,953,552 | Stampa | Sept. 20, 1960 |
| 2,954,367 | Vandenberg | Sept. 27, 1960 |
| 3,010,948 | Field et al. | Nov. 28, 1961 |

OTHER REFERENCES

Billmeyer: Textbook of Polymer Chemistry, Interscience Publishers Inc., New York, N.Y. (1957), page 239.